(12) United States Patent
Balmer et al.

(10) Patent No.: US 8,894,794 B2
(45) Date of Patent: Nov. 25, 2014

(54) METHOD OF MAKING A FLOOR PANEL (75) Inventors: Richard H. Balmer, Manheim, PA (US); Shih Chung Lee, Taipei (TW); Dung V. Dao, Lititz, PA (US); John R. Eshbach, Jr., Marietta, PA (US); Heath E. Harrington, Columbia, PA (US); Michael E. Buckwalter, New Providence, PA (US); Kean M. Anspach, Quarryville, PA (US)

(73) Assignee: AWI Licensing Company, Wilmington, DE (US)

( * ) Notice: Subject to any disclaimer, the term of this patent is extended or adjusted under 35 U.S.C. 154(b) by 369 days.

(21) Appl. No.: 12/859,357

(22) Filed: Aug. 19, 2010

(65) Prior Publication Data

US 2011/0042003 A1 Feb. 24, 2011

Related U.S. Application Data

(60) Provisional application No. 61/235,742, filed on Aug. 21, 2009.

(51) Int. Cl.
*B29C 65/48* (2006.01)
*B32B 38/04* (2006.01)
*B32B 38/10* (2006.01)
*E04F 15/10* (2006.01)
*B32B 37/12* (2006.01)
*B32B 37/26* (2006.01)

(52) U.S. Cl.
CPC ............ *E04F 15/10* (2013.01); *B32B 37/1284* (2013.01); *B32B 2309/105* (2013.01); *E04F 2201/07* (2013.01); *B32B 2607/00* (2013.01); *B32B 2037/268* (2013.01); *E04F 2203/06* (2013.01)
USPC ............ 156/248; 156/271; 156/289; 269/305

(58) Field of Classification Search
USPC ................. 156/248, 268, 269, 271, 289, 719; 269/305
See application file for complete search history.

(56) References Cited

U.S. PATENT DOCUMENTS 476,481 A * 6/1892 Newcomb .................... 269/87.1
2,737,693 A 3/1956 Robbins
(Continued)

FOREIGN PATENT DOCUMENTS

AU 2006201915 B1 5/2007
AU 2006252200 B2 7/2007
(Continued)

OTHER PUBLICATIONS

Lowe's Home Center, Inc.'s Surface Source point-of-sale materials.

*Primary Examiner* — Michael Tolin
(74) *Attorney, Agent, or Firm* — Amy M. Fernandez (57) ABSTRACT

A method of making a floor panel includes the steps of: providing an adhesive on a release member; laminating or marrying the release member to a bottom layer such that the adhesive is between the release member and the bottom layer; removing a portion of the release member to expose an area of the adhesive; and adhering a top layer to the area such that the top layer is offset with respect to the bottom layer in a direction of length and width and a marginal end portion of a top surface of the bottom layer and a marginal end portion of the bottom surface of the top layer is exposed.

20 Claims, 12 Drawing Sheets

(56) References Cited

U.S. PATENT DOCUMENTS

| | | | |
|---|---|---|---|
| 2,914,815 A | 12/1959 | Alexander | |
| 3,270,473 A | 9/1966 | Smith | |
| 3,532,652 A * | 10/1970 | Zang et al. | 428/355 AC |
| 3,866,267 A | 2/1975 | Poletti | |
| 3,902,293 A | 9/1975 | Witt et al. | |
| 3,966,532 A * | 6/1976 | Harasta | 156/714 |
| 3,988,187 A | 10/1976 | Witt et al. | |
| 4,242,390 A | 12/1980 | Nemeth | |
| 4,489,115 A | 12/1984 | Layman et al. | |
| 4,649,069 A | 3/1987 | Tone | |
| 4,766,022 A | 8/1988 | Tone | |
| 4,804,569 A | 2/1989 | Arisawa | |
| 5,045,389 A | 9/1991 | Campagna | |
| 5,382,462 A | 1/1995 | Pacione | |
| 5,750,227 A | 5/1998 | Adams | |
| 5,894,700 A | 4/1999 | Sweet | |
| 6,017,408 A * | 1/2000 | Rogers et al. | 156/249 |
| 6,298,624 B1 | 10/2001 | Pacione | |
| 6,306,477 B1 | 10/2001 | Pacione | |
| 6,395,362 B1 | 5/2002 | Pacione | |
| 6,460,303 B1 | 10/2002 | Pacione | |
| 6,751,917 B2 | 6/2004 | Mao | |
| 6,797,353 B1 | 9/2004 | Pacione | |
| 6,802,167 B2 | 10/2004 | Pacione | |
| 7,155,871 B1 | 1/2007 | Stone et al. | |
| 7,185,465 B2 | 3/2007 | Pacione | |
| 7,185,473 B2 | 3/2007 | Pacione | |
| 7,194,843 B2 | 3/2007 | Pacione | |
| 7,322,159 B2 | 1/2008 | Stone et al. | |
| 7,383,663 B2 | 6/2008 | Pacione | |
| 7,412,806 B2 | 8/2008 | Pacione et al. | |
| 7,458,191 B2 | 12/2008 | Stone | |
| 2002/0025399 A1 | 2/2002 | Sager et al. | |
| 2004/0129365 A1 | 7/2004 | Buckwalter et al. | |
| 2005/0076606 A1 | 4/2005 | Curtis | |
| 2005/0229534 A1 * | 10/2005 | Scott et al. | 52/746.1 |
| 2006/0185303 A1 | 8/2006 | Pacione et al. | |
| 2007/0071512 A1 | 3/2007 | Pawlik et al. | |
| 2007/0079572 A1 | 4/2007 | Pacione | |
| 2007/0204428 A1 | 9/2007 | Pacione | |
| 2007/0204556 A1 | 9/2007 | Pacione | |
| 2008/0000569 A1 * | 1/2008 | Williamson | 156/64 |
| 2008/0172968 A1 | 7/2008 | Pacione | |
| 2008/0289277 A1 | 11/2008 | Stone | |
| 2009/0031657 A1 | 2/2009 | Pacione | |
| 2009/0038251 A1 | 2/2009 | Pacione | |

FOREIGN PATENT DOCUMENTS

| | | |
|---|---|---|
| CA | 2260073 C | 1/1998 |
| CA | 2513973 A1 | 8/2004 |
| CA | 2568978 | 2/2009 |

* cited by examiner

METHOD OF MAKING A FLOOR PANEL

CROSS-REFERENCE TO RELATED APPLICATIONS

This application claims priority from U.S. patent application Ser. No. 61/235,742, filed Aug. 21, 2009, which is hereby incorporated by reference in its entirety.

FIELD OF THE INVENTION

The present invention relates to a method of making a floor panel, wherein the floor panel comprises a top layer and a bottom layer adhered together in an offset relationship such that a marginal end portion of a top surface of the bottom layer and a marginal end portion of a bottom surface of the top layer are exposed.

BACKGROUND OF THE INVENTION

Floor panels for use in floating floor systems typically comprise a top layer and a bottom layer adhered together in an offset relationship such that a substantially L-shaped marginal end portion of a top surface of the bottom layer and a substantially L-shaped marginal end portion of a bottom surface of the top layer are exposed. The top layer typically comprises at least one mix layer, a print film, a wear layer, and a top coat. The bottom layer typically comprises at least one mix layer. The bottom layer has a thickness about equal to or greater than the top layer. A ratio of a thickness of the top layer to a thickness of the bottom layer is typically in the range of about 2 or less. For example, the SURFACE SOURCE product sold by Lowe's Home Centers, Inc. has a top layer with a thickness of about 64 mils (about 1.63 millimeters), and a bottom layer with a thickness of about 61 mils (about 1.55 millimeters). Thus, the ratio of the thickness of the top layer to the bottom layer is about 1.05 (64 mils/61 mils=1.05).

In order to assemble the floating floor system, at least one of the marginal end portions of each of the floor panels is provided with an adhesive. The marginal end portion provided with the adhesive is engaged with the marginal end portion of an adjacent floor panel to form the floating floor system. The floor panels may be formed, for example, such that when the floating floor system is assembled on a sub-floor ends of the top layers of the adjacent floor panels substantially abut, while ends of the bottom layers of the adjacent floor panels are spaced apart a desired distance so that a gap is formed there between. Alternatively, the floor panels may be formed, for example, such that when the floating floor system is assembled on the sub-floor the ends of the top layers of the adjacent floor panels substantially abut and the ends of the bottom layers of the adjacent floor panels substantially abut.

Because the thickness of the bottom layer is significantly large (about 98 mils (about 2.5 millimeters)), when the floor panels are assembled such that a gap is formed between the ends of the bottom layers of the adjacent floor panels, the gap can telescope through the floor panels thereby significantly altering the aesthetic and structural characteristics of the top layer. For example, the gaps may cause buckling at a top surface of the top layer. Alternatively, when the floor panels are assembled such that the ends of the bottom layers of the adjacent floor panels substantially abut, unwanted gaps or overlapping can occur between the ends of the bottom layers due to deviations in the size of the marginal end portions and/or errors occurring during installation. These unwanted gaps or overlaps can additionally telescope through the floor panel thereby also significantly altering the aesthetic and structural characteristics of the top layer.

Additionally, the marginal end portions of the top layer of a first row of the floor panels, which are typically positioned adjacent a wall, remain unsupported when the floating floor system is assembled, because the marginal end portions of the top layer of the first row of the floor panels will not engage with an adjacent floor panel. Thus, because the thickness of the bottom layer is significantly large, the gap occurring between the sub-floor and the marginal end portion of the top layer will also negatively impact the aesthetic and structural characteristics of the top layer. For example, buckling at the top surface of the top layer can occur. Also, because the bottom layer and the top layer comprise mix layers, which contain fillers, the bottom layer and the top layer are prone to absorb moisture thereby further affecting the aesthetic and structural characteristics of the floor panels. This is particularly problematic, since the bottom layer is installed directly on a sub-floor.

Still further, because the bottom layer has a thickness greater than the top layer, when the floor panels are stacked, for example, during shipping, a space exists between the marginal end portions of the top layer of the adjacent flooring panels equal to the thickness of the bottom layer. Thus, during shipping, the unsupported marginal end portions of the top layer are prone to bend and/or curl an amount equal to the thickness of the bottom layer. Because of the structural characteristics of the top layer, these bends and/or curls remain in the marginal end portions of the top layer during installation and can thereby significantly alter the aesthetic and structural characteristics of the floor panel. For example, buckling can occur at the top surface of the top layer and/or the bond strength between the marginal end portions of the adjacent floor panels could be negatively affected.

In view of the foregoing, there still remains a need to develop a floor panel that overcomes the above-described problems. Additionally, there still remains a need to simplify the manufacturing process for such floor panels and reduce the expense associated therewith.

BRIEF SUMMARY OF THE INVENTION

The invention relates to a method of making a floor panel comprising: providing an adhesive on a release member; laminating or marrying the release member to a bottom layer such that the adhesive is between the release member and the bottom layer; removing a portion of the release member to expose an area of the adhesive; and adhering a top layer to the area such that the top layer is offset with respect to the bottom layer in a direction of length and width and a marginal end portion of a top surface of the bottom layer and a marginal end portion of the bottom surface of the top layer is exposed.

DETAILED DESCRIPTION OF THE EMBODIMENT(S)

Figure 1:
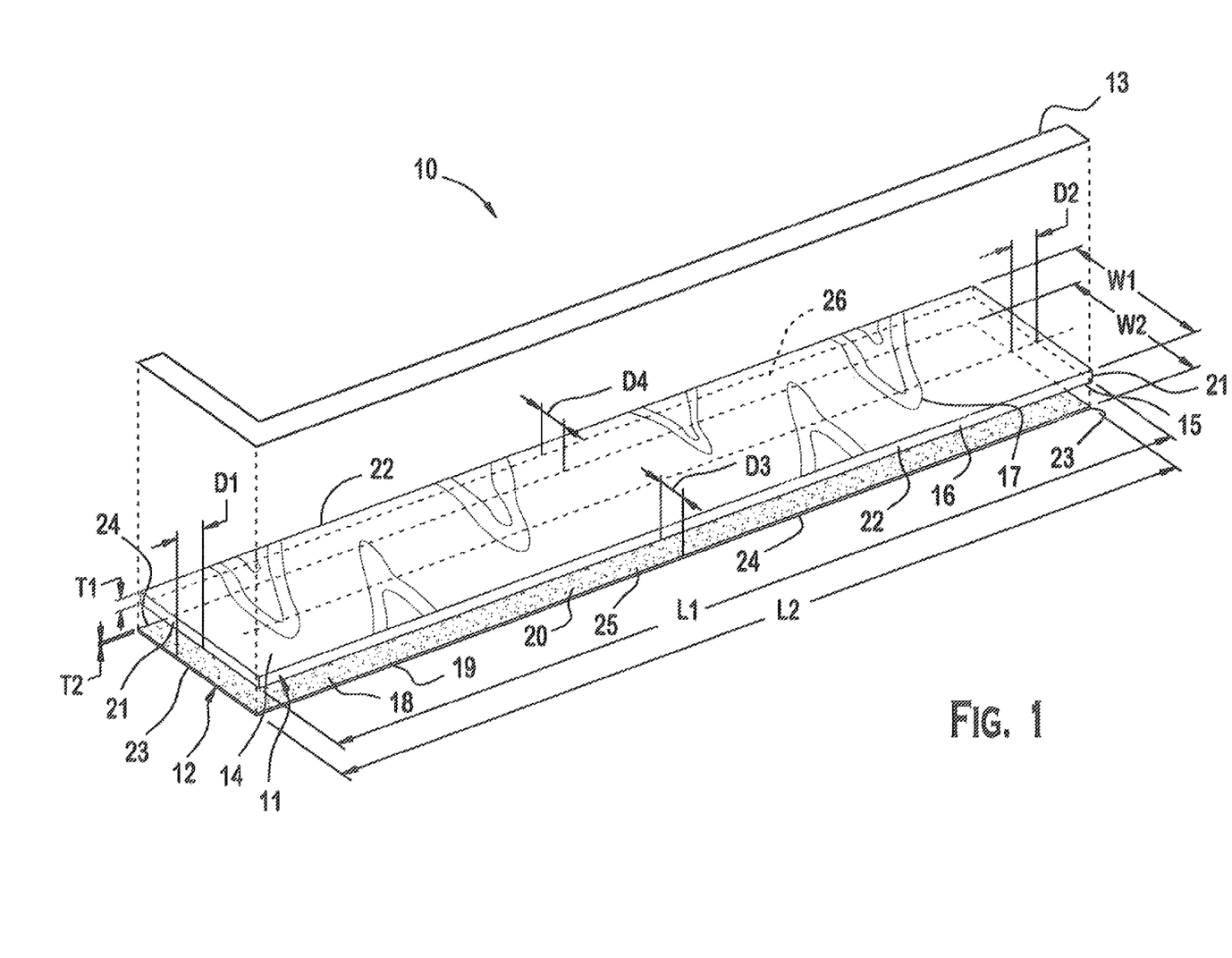
FIG. 1 is a perspective view of a floor panel according to an embodiment of the invention.
Figure 2:
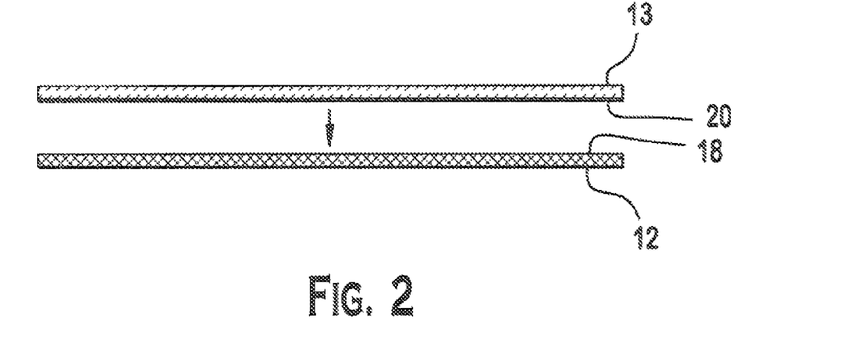
FIG. 2 is a schematic illustration of a method of attaching a bottom layer of the floor panel to a release member of the floor panel to form a continuous sheet.
Figure 3:
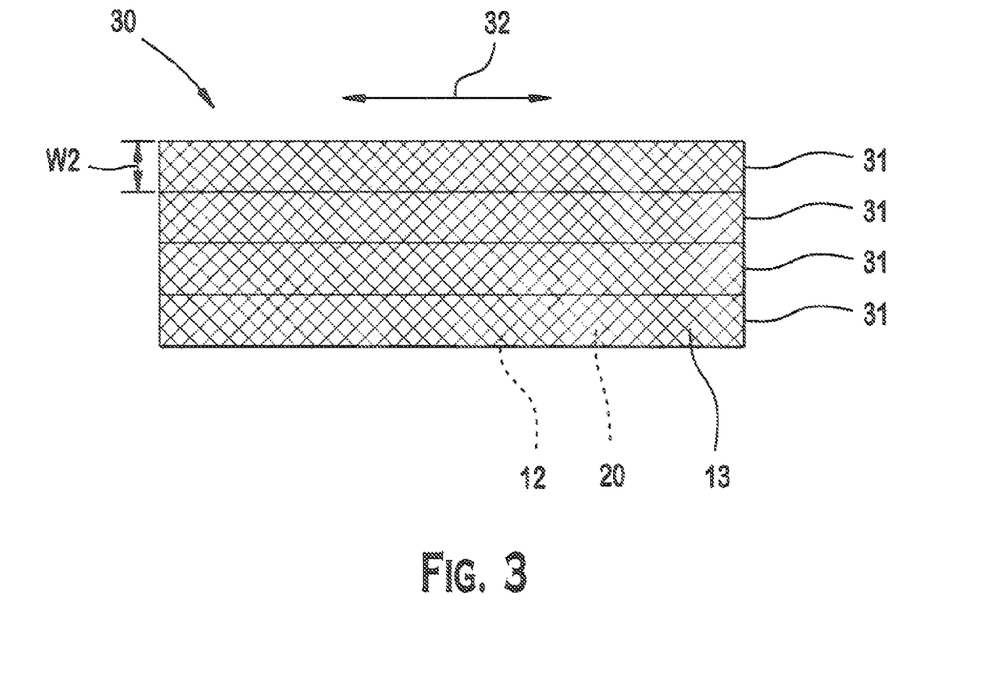
FIG. 3 is a schematic illustration of a method of cutting the continuous sheet into strips having a desired width.

FIGS. 1-3 show a floor panel 10 according to an embodiment of the invention. As shown in FIG. 1, the floor panel 10 comprises a top layer 11, a bottom layer 12, and a release member 13. The top layer 11 may be formed, for example, from a substantially flexible sheet material, such as plastic, vinyl, polyvinyl chloride, polyester, or combinations thereof. The top layer 11 has a top surface 14 with a visible decorative pattern 17 and a bottom surface 15. In the illustrated embodiment, the top layer 11 comprises at least one mix layer 16, a print film provided with the visible decorative pattern 17, a wear layer (not shown), and a top coat (not shown), respectively. It will be appreciated by those skilled in the art that although the top layer 11 is shown and described herein as comprising multiple layers that the top layer 11 may alternatively comprise a single layer. Additionally, the types of layers constituting the top layer 11 and the visible decorative pattern 17 could be varied depending on the desired characteristics of the top layer 11.

As shown in FIG. 1, the top layer 11 has a thickness T1 of about 20-200 mils (about 0.508-5.08 millimeters), preferably about 60-180 mils (about 1.524-4.572 millimeters), and more preferably about 80-150 mils (about 2.032-3.810 millimeters). In the illustrated embodiment, the top layer 11 is substantially rectangular in shape and has a length L1 of about 36 inches (about 91.4 centimeters) and a width W1 of about 6 inches (about 15.2 centimeters). However, it will be appreciated by those skilled in the art that the geometrical shape and the length L1 and the width W1 of the top layer 11 may be varied depending on the desired dimension and geometrical configuration of the floor panel 10. For example, the top layer 11 may alternatively have a substantially square shape.

As shown in FIG. 1, the bottom layer 12 has a top surface 18 and a bottom surface 19. The bottom layer 12 may be formed, for example, from a film or tape comprising plastic, vinyl, polyvinyl chloride, polyester, polyolefin, nylon, or combinations thereof. The bottom layer 12 may also include recycle material, such as post industrial or post consumer scrap. The film or tape may be rigid or flexible and is preferably moisture resistant or waterproof. Additionally, the film or tape may be capable of being delivered or shipped in a roll. In the illustrated embodiment, the bottom layer 12 comprises a single layer of rigid black polyvinyl chloride film. Alternatively, the bottom layer 12 could comprise multiple layers, such as two layers of film laminated with a mat, such as a glass mat or polyethylene terephthalate mat, there between. The bottom layer 12 could also be provided with at least one of a continuous or discontinuous ink layer, antimicrobial layer, sound deadening layer, cushioning layer, slide resistant layer, stiffening layer, channeling layer, mechanically embossed texture, or chemical texture.

As shown in FIG. 1, the bottom layer 12 has a thickness T2 less than the thickness T1 of the top layer 11. The thickness T2 of the bottom layer 12 is, for example, about 1-60 mils (about 0.0254-1.524 millimeters), preferably about 6.5-12 mils (about 0.1651-0.3048 millimeters), and more preferably about 8 mils (about 0.2032 millimeters). A ratio of the thickness T1 of the top layer 11 to the thickness T2 of the bottom layer 12 is about 5 or greater, preferably about 10-100, and more preferably about 10-25. The bottom layer 12 has a length L2 and a width W2 the same as the length L1 and the width W1 of the top layer 11. Thus, in the illustrated embodiment, the bottom layer 12 is substantially rectangular in shape and has the length L2 of about 36 inches (about 91.4 centimeters) and the width W2 of about 6 inches (about 15.2 centimeters). However, it will be appreciated by those skilled in the art that the geometrical shape and the length L1 and the width W1 of the bottom layer 12 may be varied depending on the desired dimension and geometrical configuration of the floor panel 10. For example, the bottom layer 12 may alternatively have a substantially square shape.

As shown in FIG. 1, the bottom surface 15 of the top layer 11 is laminated to the top surface 18 of the bottom layer 12 by an adhesive 20. The adhesive 20 may be, for example, any suitable adhesive, such as a hot melt adhesive, a pressure sensitive adhesive, or a structural and/or reactive adhesive. In the illustrated embodiment, the adhesive is a pressure sensitive acrylic adhesive. The adhesive 20 may have, for example, a bond strength of at least 25 force-pounds, and more preferably about 25-30 force-pounds after having been heat aged for about 24 hours at 145 degrees Fahrenheit. In the illustrated embodiment, the adhesive 20 is provided on substantially an entirety of the top surface 18 of the bottom layer 12. The adhesive 20 may be applied to have a thickness, for example, of about 1-2 mils (about 0.0254-0.0508 millimeters). It will be appreciated by those skilled in the art, however, that the thickness of the adhesive 20 may vary depending on the texture of the bottom surface 15 of the top layer 11 and the texture of the top surface 18 of the bottom layer 12 in that a substantially smooth surface would require less of the adhesive 20 due to better adhesion and bond strength.

The top layer 11 is adhered to the bottom layer 12 so that the top layer 11 is offset from the bottom layer 12 in a direction of the length L1, L2 and the width W1, W2. In other words, opposing first ends 21 of the top layer 11 are offset in the direction of the length L1, L2 from opposing first ends 23 of the bottom layer 12 an offset distance D1, D2 and opposing second ends 22 of the top layer 11 are offset in the direction of the width W1, W2 from opposing second ends 24 of the bottom layer 12 an offset distance D3, D4. The offset distances D1, D2, D3, D4 are substantially the same. In the illustrated embodiment, the offset distances D1, D2, D3, D4 are, for example, about 1 inch (about 2.5 centimeters). It will be appreciated by those skilled in the art, however, that the offset distances D1, D2, D3, D4 may be varied depending on the desired configuration of the floor panel 11. Examples of possible variations in the offset distances D1, D2, D3, D4 are set forth, for example, in U.S. patent application Ser. No. 12/412,419, filed Mar. 27, 2009, which is hereby incorporated by reference in its entirety. Because the adhesive 20 is provided on substantially the entirety of the top surface 18 of the bottom layer 12, due to the offset of the top layer 11 relative to the bottom layer 12, a substantially L-shaped marginal end portion of the top surface 18 of the bottom layer 12 remains exposed to form an adhesive surface 25, and a substantially L-shaped marginal end portion of the bottom surface 15 of the top layer 11 remains exposed to form an attachment surface 26.

As shown in FIG. 1, the release member 13 is positioned adjacent to the substantially L-shaped marginal end portion of the top surface 18 of the bottom layer 12 to cover the adhesive surface 25 during shipping of the floor panel 10 and prior to the installation thereof. In the illustrated embodiment, the release member 13 is a flexible sheet corresponding in size and shape to the substantially L-shaped marginal end portion of the top surface 18 of the bottom layer 12. It will be appreciated by those skilled in the art, however, that the size and shape of the release member 13 may be varied, as long as the release member 13 adequately covers the adhesive surface 25. The release member 13 may be made, for example, from any known suitable release material, such as a poly or silicone coated paper, a plastic sheet, a polymer film, or other material that enables the release member 13 to be quickly and easily removed from the adhesive surface 25 during the installation of the floor panel 10. The release member 13 may additionally be provided with a tab (not shown) that extends from the release member 13 in order to increase the ease of removal of the release member 13 from the adhesive surface 25 during the installation of the floor panel 10.

A method of making the floor panel 10 will now be described in greater detail with reference to FIGS. 2-13. As shown in FIG. 2, a continuous sheet of the release member 13 and a continuous sheet of the bottom layer 12 are provided. The release member 13 and the bottom layer 12 may be provided, for example, in rolls. The adhesive 20 is applied to a surface of the release member 13. The adhesive 20 may be applied using any known application methods, such as spraying, roll coating, or air knife coating. The release member 13 provided with the adhesive 20 is then laminated or married to the top surface 18 of the bottom layer 12 such that the adhesive 20 is arranged between the release member 13 and the bottom layer 12 to form a continuous sheet 30 consisting of the bottom layer 12, the adhesive 20, and the release member 13. Additionally, prior to lamination or marrying, it is conceivable that the bottom layer 12 could be annealed.

Figure 4:
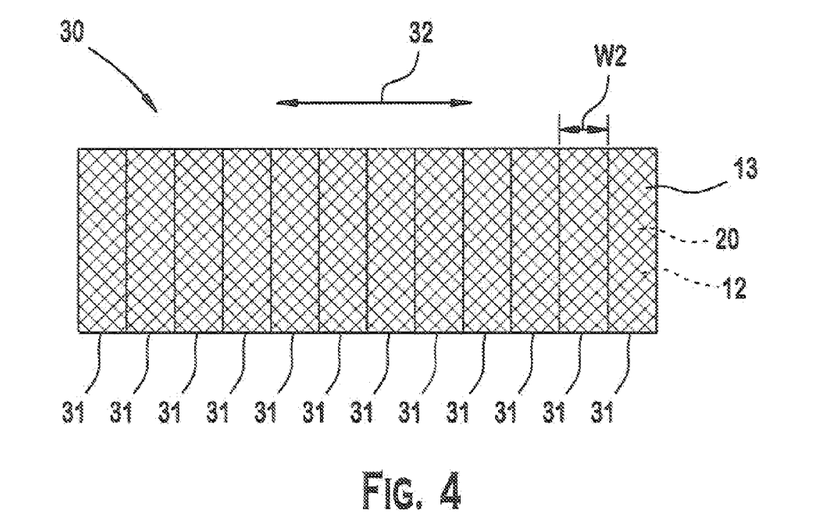
FIG. 4 is a schematic illustration of an alternative method of cutting the continuous sheet into strips having a desired width.
Figure 5:
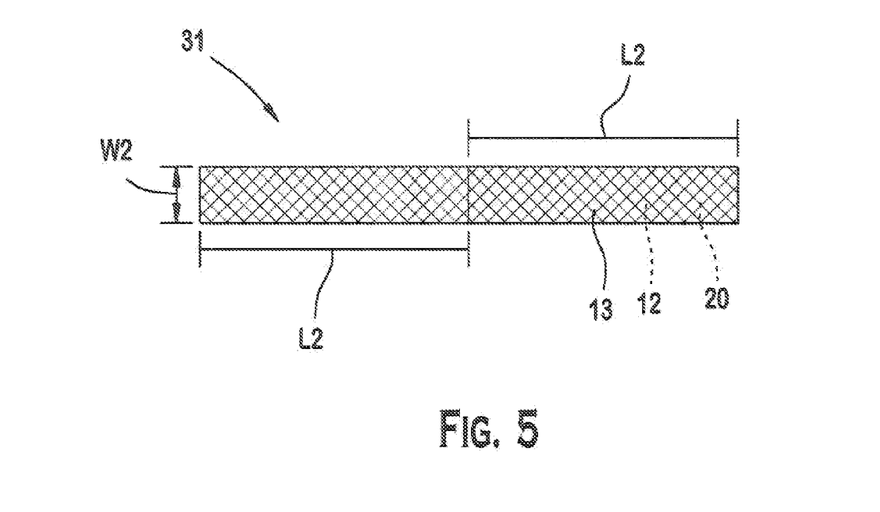
FIG. 5 is a schematic illustration of a method of cutting the strips to a desired length.

As shown in FIG. 3, the continuous sheet 30 consisting of the bottom layer 12, the adhesive 20, and the release member 13 is then cut into strips 31. The strips 31 are formed by slitting the continuous sheet 30 substantially parallel to a direction of tension 32 of the bottom layer 12. Each of the strips 31 is cut to the width W2. When the strips 31 are formed by slitting the continuous sheet 30 substantially parallel to the direction of tension 32 of the bottom layer 12, the direction of tension 32 of the bottom layer 12 is substantially perpendicular to the width W2 of the bottom layer 12. The continuous sheet 30 may be slit into the strips 31 either manually or by using conventional converting and stripping machines. Alternatively, as shown in FIG. 4, the strips 31 may be formed by slitting the continuous sheet 30 substantially perpendicular to the direction of tension 32 of the bottom layer 12. When the strips 31 are formed by slitting the continuous sheet 30 substantially perpendicular to the direction of tension 32 of the bottom layer 12, the direction of tension 32 of the bottom layer 12 is substantially parallel to the width W2 of the bottom layer 12. Thus, when assembled to the top layer 11 (described below), the top layer 11 is capable of counteracting the tension in the bottom layer 12 thereby enhancing performance of the floor panel 10. As shown in FIG. 5, after the continuous sheet 30 has been cut into the strips 31 having the width W2, the strips 31 are then cut to the length L2. The strips 31 may be cut to the length L2 either manually or using conventional sheeting machines.

Figure 6:
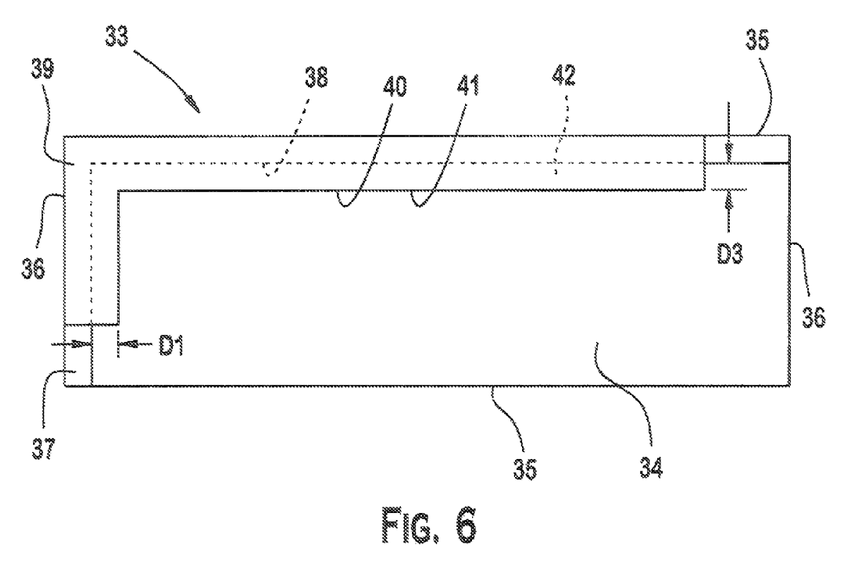
FIG. 6 is a schematic illustration of a stripping jig.

As shown in FIG. 6, a stripping jig 33 is provided for removing a portion of the release member 13 in order to expose the adhesive 20 for attachment of the top layer 11 to the bottom layer 12. The stripping jig 33 comprises a base 34. The base 34 may be substantially rectangular in shape and may be formed, for example, from a substantially flat metal plate. The base has first sides 35 and second sides 36 that extend substantially perpendicular to the first sides 35. A substantially L-shaped abutment member 37 is provided along one of the adjacent first and second sides 35, 36 of the base 34. The abutment member 37 has an abutment edge 38 for abutting the bottom layer 12. The abutment member 37 may be formed, for example, from a substantially flat metal plate. A substantially L-shaped cutting member 39 is provided on a top surface of the abutment member 37. The cutting member 39 has a cutting surface 40 provided on a cutting edge 41 thereof. The cutting member 39 is provided on the top surface of the abutment member 37 such that the cutting edge 41 extends from the abutment edge 38 on the first side 35 of the base 34 the offset distance D3 and extends from the abutment edge 38 of the second side 36 of the base 34 the offset distance D1. Additionally, because the cutting member 39 is provided on the top surface of the abutment member 37, a space 42 is created between the base 34 and the cutting member 39 that has a height substantially equal to a height of the abutment member 37.

Figure 7:
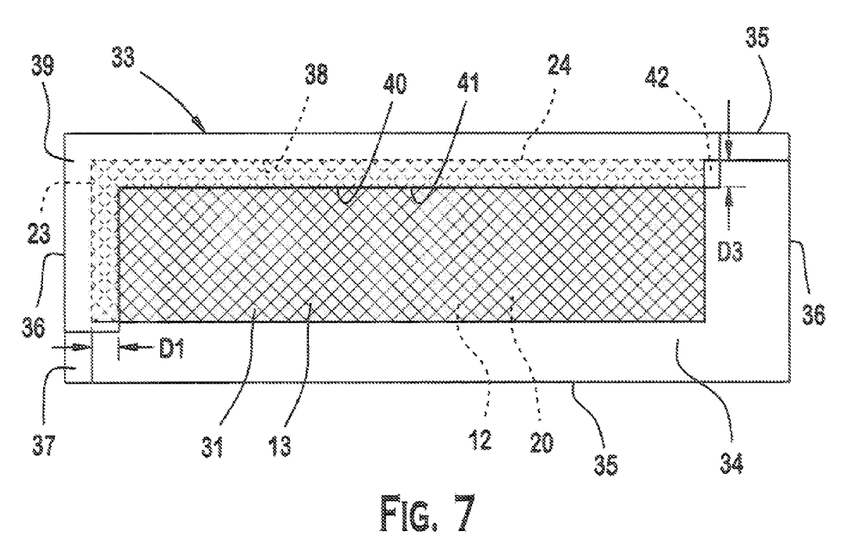
FIG. 7 is a schematic illustration of the stripping jig with the strip positioned therein prior to removal of a portion of the release member.
Figure 7A:
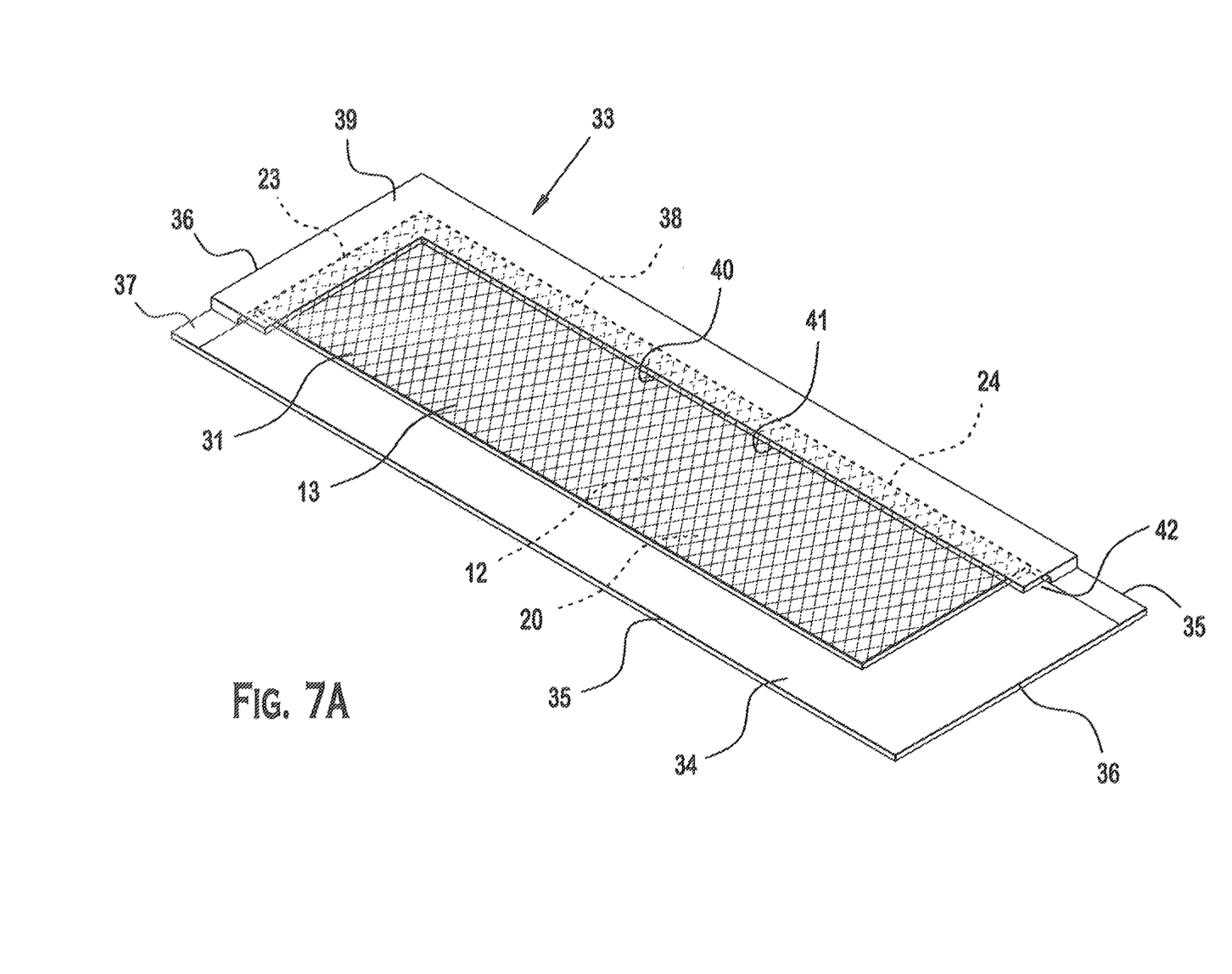
FIG. 7A is a perspective view of the stripping jig with the strip positioned therein prior to removal of the portion of the release member.
Figure 8:
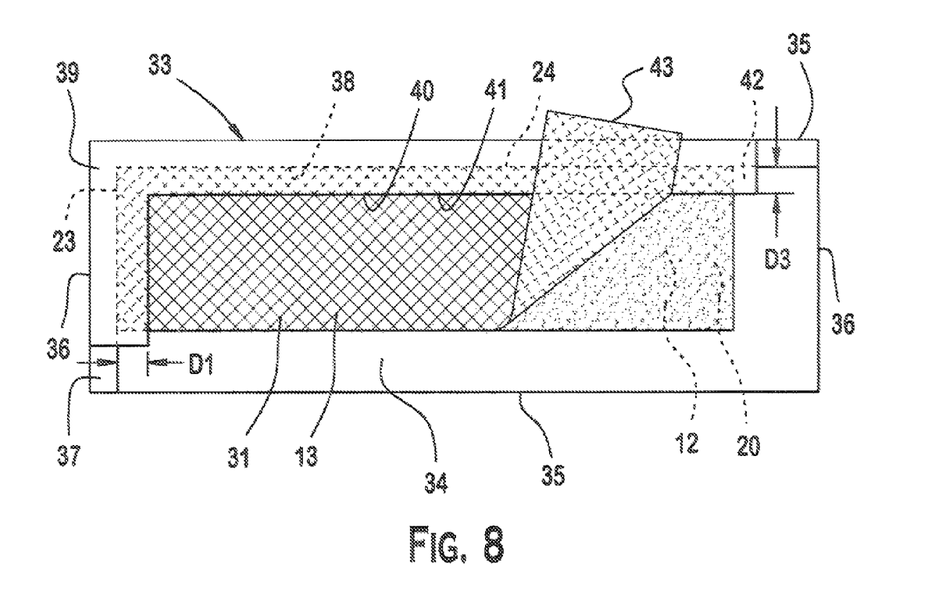
FIG. 8 is a schematic illustration of the removal of the portion of the release member.
Figure 8A:
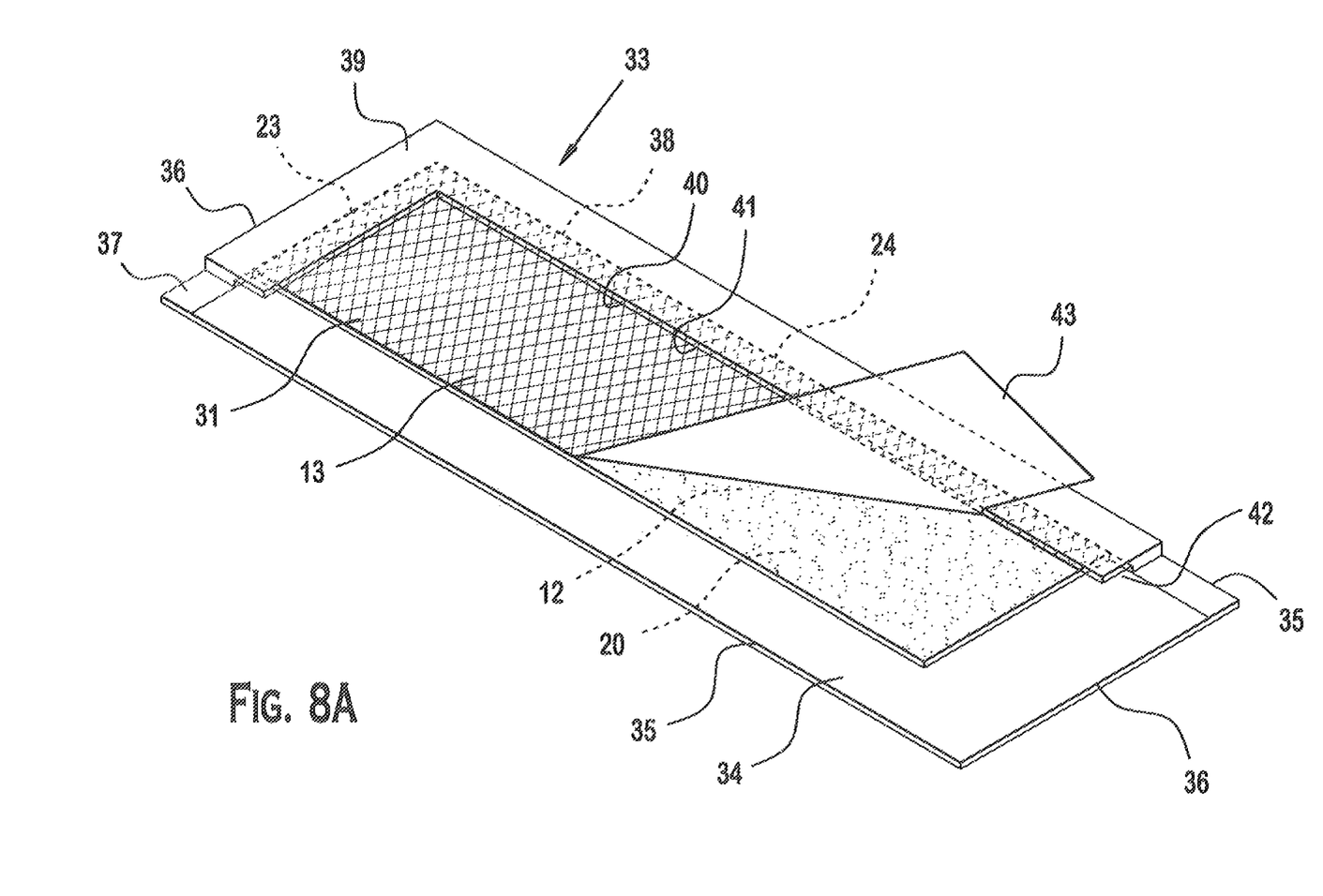
FIG. 8A is a perspective view of the removal of the portion of the release member.
Figure 9:
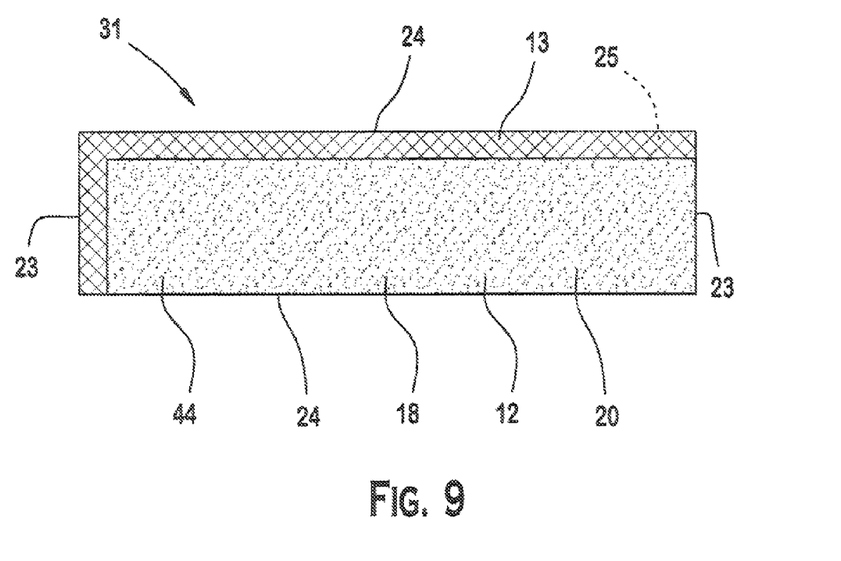
FIG. 9 is a schematic illustration of the strip with the portion of the release member removed.

As shown in FIGS. 7 and 7A, one of the strips 31, which has already been cut to the width W2 and the length L2, is inserted into the space 42 in the stripping jig 33. The strip 31 is inserted into the space 42 until one set of the adjacent first and second ends 23, 24 of the bottom layer 12 substantially abuts the abutment edge 38 of the abutment member 37. As shown in FIGS. 8 and 8A, as the strip 31 is securely held in the stripping jig 33, a portion 43 of the release member 13 is pulled away from the bottom layer 12 thereby releasing the release member 13 from the adhesive 20. As the release member 13 is pulled, the release member 13 is cut by the cutting edge 41 on the cutting surface 40 of the cutting member 39. As a result of the removal of the release member 13, the adhesive 20 is transferred to the bottom layer 12. Once the release member 13 has been cut from the bottom layer 12, the strip 31 is removed from the stripping jig 33. As shown in FIG. 9, as a result of the removal of the portion 43 of the release member 13, the top surface 18 of the bottom layer 12 has an exposed area 44 with the adhesive 20. Additionally, the substantially L-shaped adhesive surface 25 of the bottom layer 12 is formed.

Figure 10:
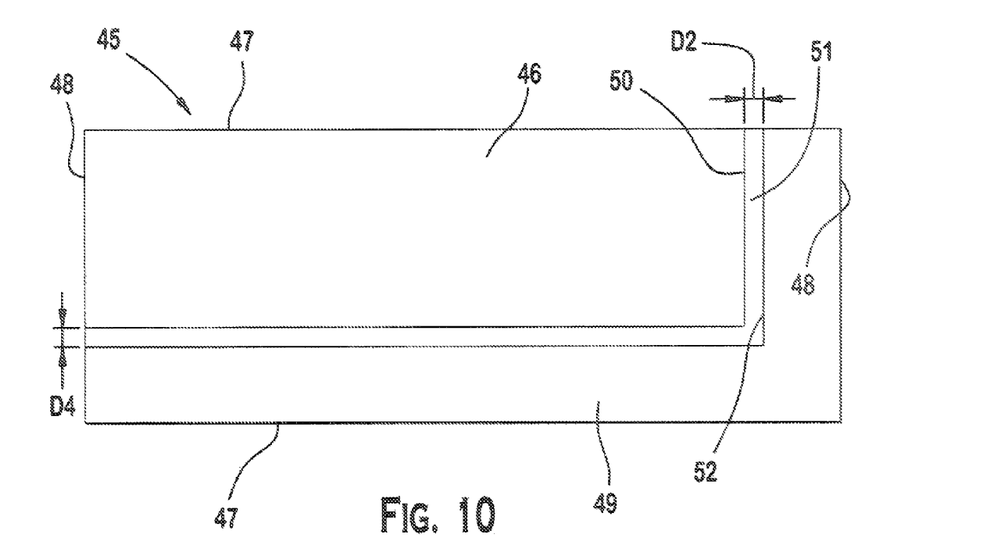
FIG. 10 is a schematic illustration of an assembly jig.

As shown in FIG. 10, an assembly jig 45 is provided for assembling the top layer 11 to the exposed area 44 on the top surface 18 of the bottom layer 12. The assembly jig 45 comprises a base 46. The base 46 may be substantially rectangular in shape and may be formed, for example, from plastic, wood, or metal and may be machined. The base 46 has first sides 47 and second sides 48 that extend substantially perpendicular to the first sides 47. A substantially L-shaped support member 49 is provided along one of the adjacent first and second sides 46, 47 of the base 46. The support member 49 has an abutment surface 50 for abutting the bottom layer 12. The support member 49 may be formed, for example, from plastic, wood, or metal and may be machined. The support member 49 has a stepped portion 51 with a rear abutment wall 52. The stepped portion 51 extends inward from the abutment surface 50 on the second side 48 of the base 46 the offset distance D2 and extends from the abutment surface 50 on the first side 47 of the base 46 the offset distance D4.

Figure 11:
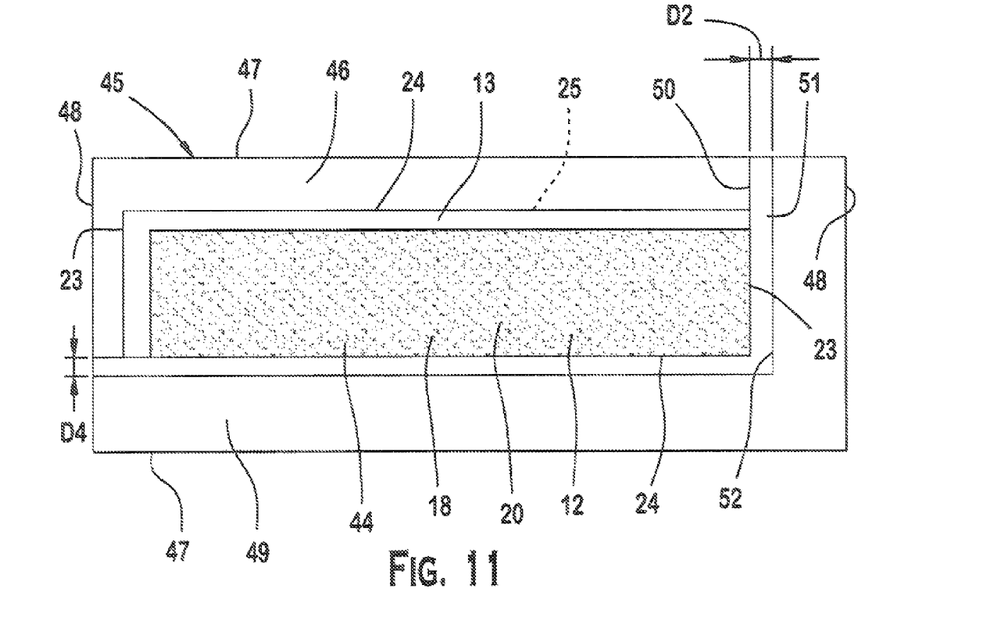
FIG. 11 is a schematic illustration of the assembly jig with the strip positioned therein prior to attachment of a top layer.
Figure 11A:
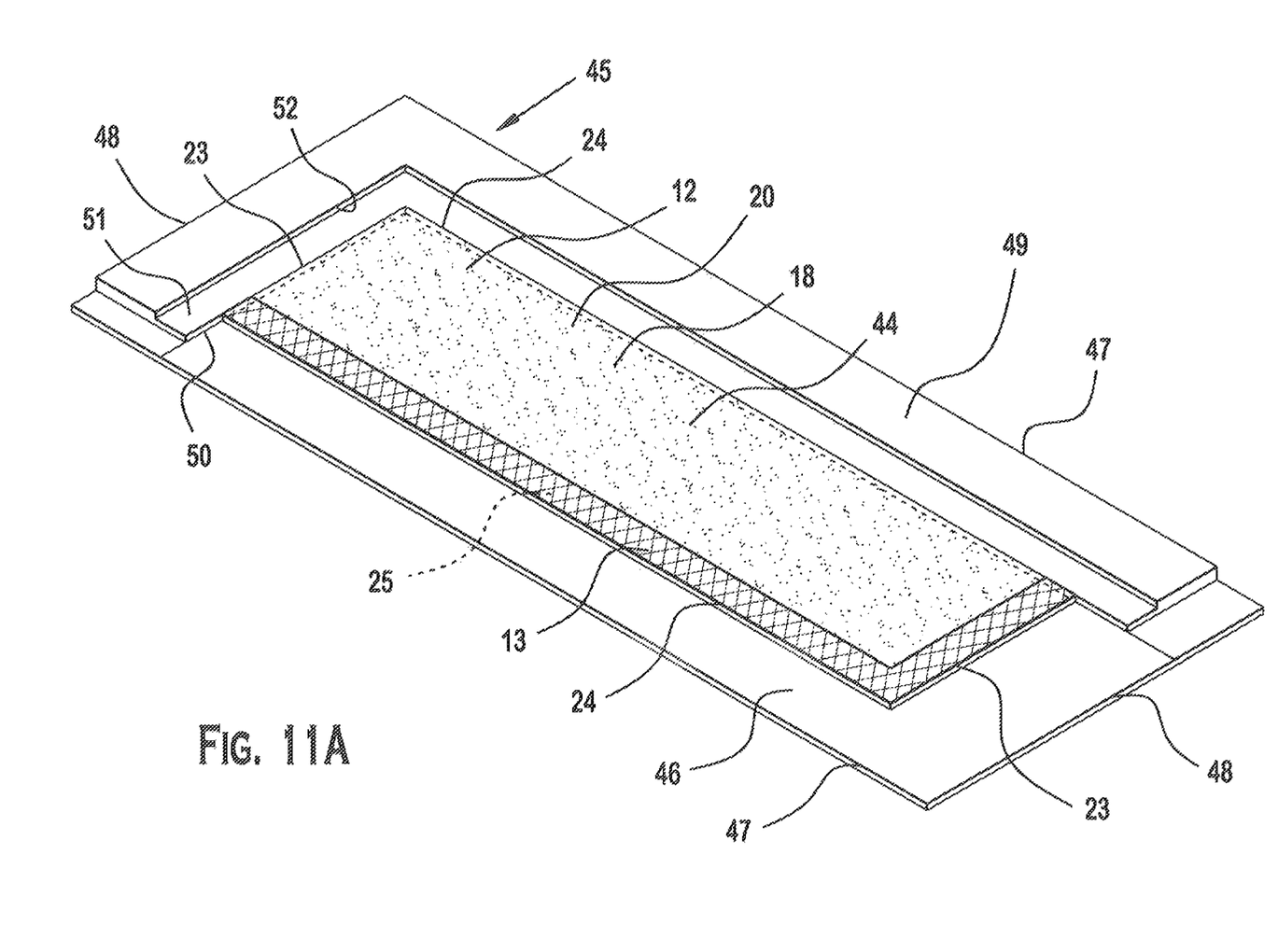
FIG. 11A is a perspective view of the assembly jig with the strip positioned therein prior to attachment of the top layer.
Figure 12:
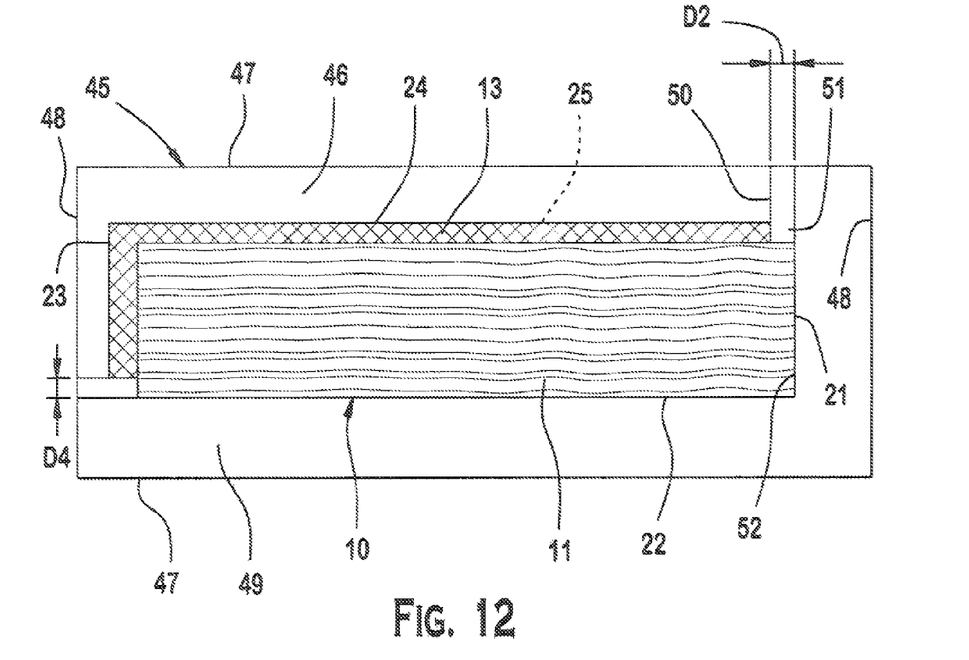
FIG. 12 is a schematic illustration of a method of attachment of the top layer.
Figure 12A:
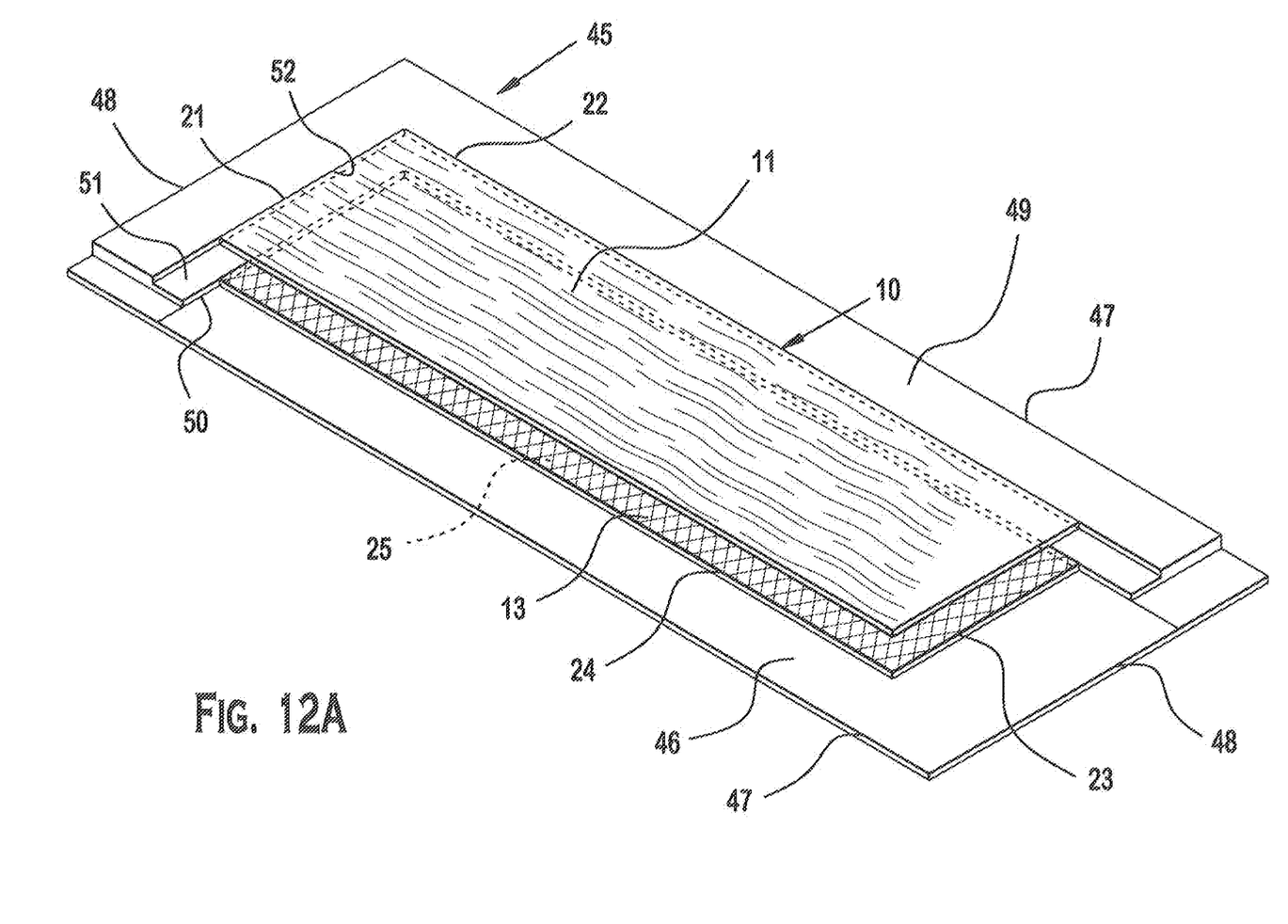
FIG. 12A is a perspective view of the method of attachment of the top layer.
Figure 13:
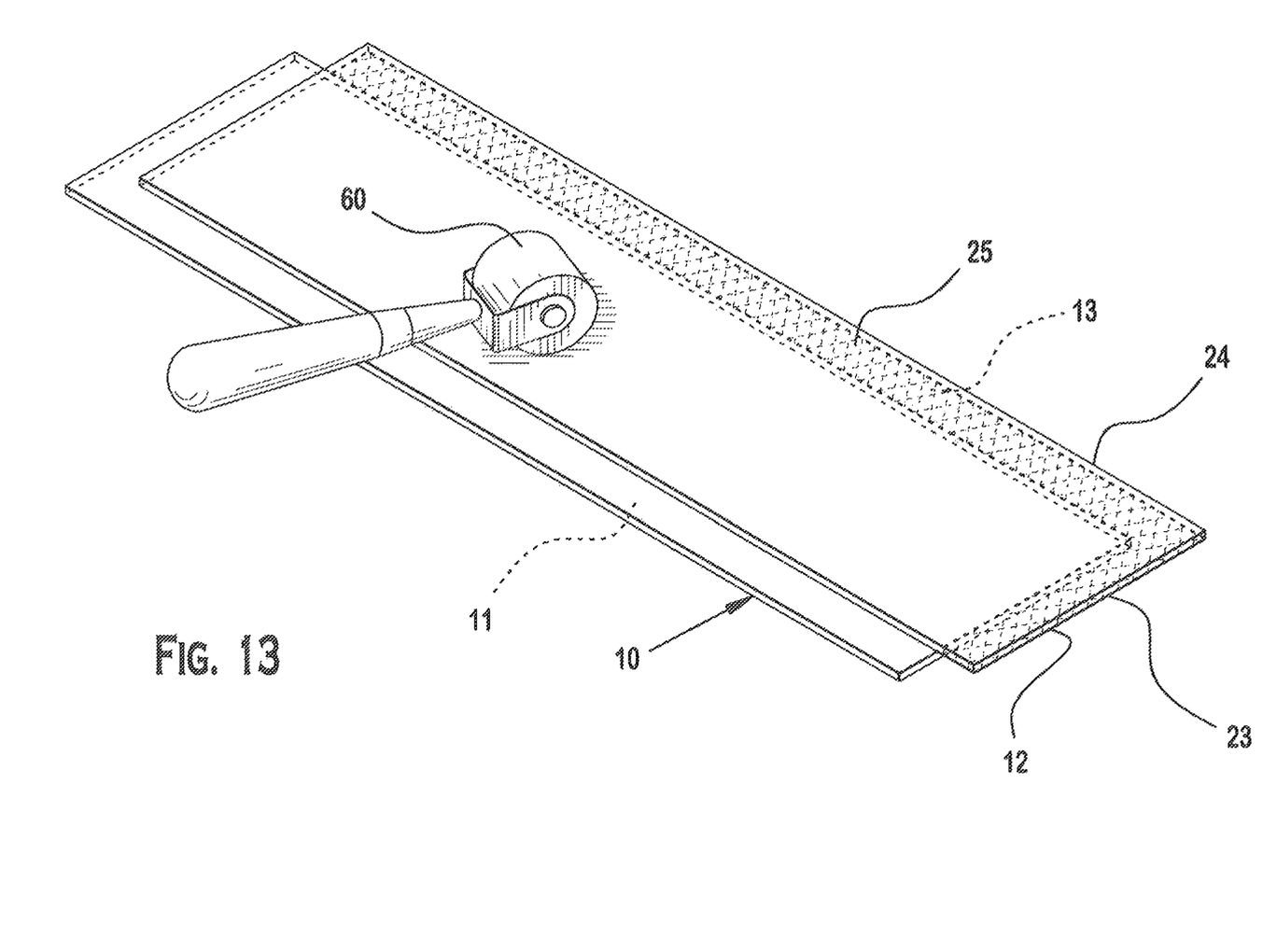
FIG. 13 is a perspective view of a method of applying further pressure to the floor panel.
Figure 14:
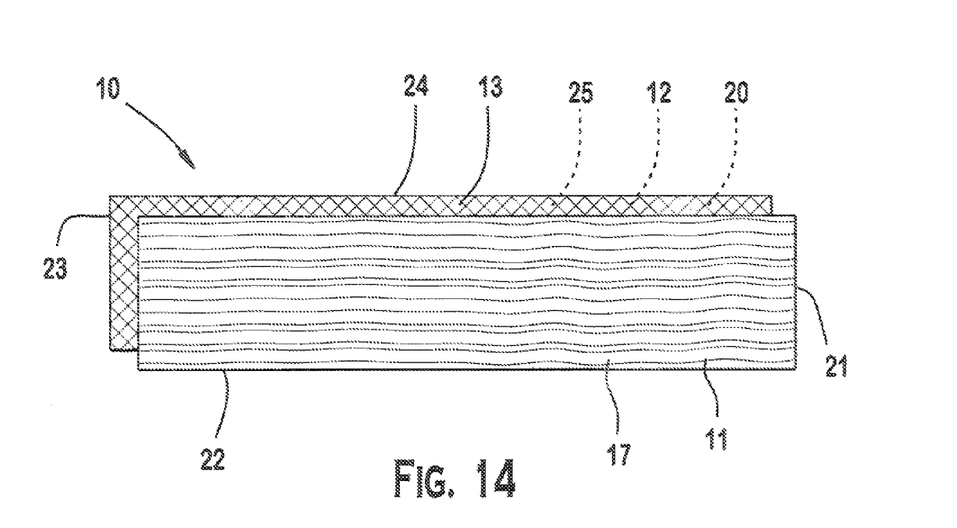
FIG. 14 is a schematic illustration of the floor panel.

As shown in FIGS. 11 and 11A, the strip 31, which has the exposed area 44, is positioned within the assembly jig 45 such that one set of the adjacent first and second ends 23, 24 of the bottom layer 12 substantially abuts the abutment surface 50 of the support member 49 on the sides of the exposed area 44. As shown in FIGS. 12 and 12A, the top layer 11, which has already been cut and formed by methods well known in the art, is positioned in the stepped portion 51 such that one set of the first and second ends 21, 22 of the top layer 11 substantially abuts the rear abutment wall 52 and is aligned therewith. The top layer 11 is then pressed onto the exposed area 44 with the adhesive 20 to adhere the top layer 11 to the bottom layer 12 in an offset relationship. The bottom layer 12 with the top layer 11 adhered thereto is then removed from the assembly jig 45. As shown in FIG. 13, after removal from the assembly jig 45, a hand roller 60 or other conventional pressure applying process or device may optionally be used to apply additional pressure to the top layer 11 and/or bottom layer 12 in order to better bond the top layer 11 with the bottom layer 12. Additionally or alternatively, the floor panel 10 could be passed through a laminator. As shown in FIG. 14, the floor panel 10 is now completely assembled and ready for packaging.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method of making a floor panel, comprising:
providing an adhesive on a release member;
laminating or marrying the release member to a rigid bottom layer of the floor panel such that the adhesive is between the release member and the rigid bottom layer, the rigid bottom layer having a first length and a first width;
removing a first portion of the release member to expose an area of the adhesive; and
adhering a top layer of the floor panel to the area such that the top layer is offset with respect to the rigid bottom layer in a direction of length and width and a marginal end portion of a top surface of the rigid bottom layer and a marginal end portion of the bottom surface of the top layer is exposed, the top layer having a top surface with a visible decorative pattern, the top layer having a second length and a second width, the second length of the top layer being substantially the same as the first length of the rigid bottom layer and the second width of the top layer being substantially the same as the first width of the rigid bottom layer, wherein a ratio of a thickness of the top layer to a thickness of the rigid bottom layer is about 5 or greater.

2. The method of claim 1, wherein the marginal end portions are substantially L-shaped.

3. The method of claim 1, further comprising heat aging the adhesive for about 24 hours at 145 degrees Fahrenheit.

4. The method of claim 1, wherein a second portion of the release member remains on the marginal end portion of the top surface of the rigid bottom layer.

5. The method of claim 1, wherein the top layer is a flexible sheet material comprising plastic, vinyl, polyvinyl chloride, or polyester.

6. The method of claim 1, further comprising applying pressure to the top layer or the rigid bottom layer to further bond the top layer and the bottom layer.

7. The method of claim 1, wherein after the portion of the release member is removed to expose the area of the adhesive a substantially L-shaped portion of the release member remains laminated or married to the rigid bottom layer.

8. The method of claim 1, wherein the rigid bottom layer comprises plastic, vinyl, polyvinyl chloride, polyester, polyolefin, or nylon.

9. The method of claim 1, wherein the rigid bottom layer has a thickness less than a thickness of the top layer.

10. The method of claim 1, wherein the laminated or married release member and the rigid bottom layer form a continuous sheet.

11. The method of claim 10, further comprising slitting the continuous sheet into strips.

12. The method of claim 11, wherein the continuous sheet is slit substantially parallel to a direction of tension of the rigid bottom layer to form the strips, each of the strips having a length longer than a width thereof, the direction of tension being substantially perpendicular to the width of the strips.

13. The method of claim 11, wherein the continuous sheet is slit substantially perpendicular to a direction of tension of the rigid bottom layer to form the strips, each of the strips having a length longer than a width thereof, the direction of tension being substantially parallel to the width of the strips.

14. The method of claim 11, further comprising inserting at least one of the strips into a stripping jig.

15. The method of claim 14, further comprising cutting the release member with a cutting edge of the stripping jig while removing the portion of the release member.

16. The method of claim 11, further comprising positioning the strip having the exposed area of the adhesive into an assembly jig.

17. The method of claim 16, further comprising positioning the top layer in a stepped portion of the assembly jig while adhering the top layer to the area such that the top layer is offset with respect to the bottom layer.

18. The method of claim 1, wherein the ratio of the thickness of the top layer to the thickness of the rigid bottom layer is about 10-100.

19. The method of claim 18, wherein the ratio of the thickness of the top layer to the thickness of the rigid bottom layer is about 10-25.

20. The method of claim 1, further comprising annealing the rigid bottom layer.

* * * * *